(12) United States Patent
Marchioro

(10) Patent No.: US 7,316,203 B2
(45) Date of Patent: Jan. 8, 2008

(54) COLLAPSIBLE CAGE

(75) Inventor: Domenico Marchioro, Frazione Castelnovo (IT)

(73) Assignee: Marchioro S.p.A. Stampaggio Materie Plastiche, Isola Vicentina - Fraz. Castelnovo (IT)

( * ) Notice: Subject to any disclaimer, the term of this patent is extended or adjusted under 35 U.S.C. 154(b) by 5 days.

(21) Appl. No.: 11/171,240

(22) Filed: Jul. 1, 2005

(65) Prior Publication Data
US 2006/0005781 A1 Jan. 12, 2006

(30) Foreign Application Priority Data
Jul. 6, 2004 (IT) ............................. PD040058 U

(51) Int. Cl.
*A01K 1/02* (2006.01)
*A01K 1/03* (2006.01)
*A01K 31/06* (2006.01)

(52) U.S. Cl. ..................................... 119/474

(58) Field of Classification Search ................ 119/474, 119/452, 453, 454, 455, 461, 491, 498, 499, 119/427, 433; 446/108, 109, 111–116; 403/326, 403/327, 329, 382, 402, 403
See application file for complete search history.

(56) References Cited

U.S. PATENT DOCUMENTS

| | | | | |
|---|---|---|---|---|
| 1,915,215 A | * | 6/1933 | Carpenter | 217/69 |
| 4,702,638 A | * | 10/1987 | Zalesak | 403/403 |
| 4,900,184 A | * | 2/1990 | Cleveland | 403/397 |
| 4,966,487 A | * | 10/1990 | Sinkoff | 403/24 |
| 5,497,728 A | | 3/1996 | Watanabe et al. | |

FOREIGN PATENT DOCUMENTS

| EP | 1 234 499 A | | 8/2002 |
|---|---|---|---|
| EP | 1234499 | * | 8/2002 |
| GB | 2 183 983 A | | 6/1987 |

* cited by examiner

*Primary Examiner*—Teri Pham Luu
*Assistant Examiner*—Valentina Xavier
(74) *Attorney, Agent, or Firm*—Modiano & Associati; Albert Josif; Daniel J. O'Byrne

(57) ABSTRACT

A collapsible cage, which comprises a bottom that is surmounted by, and associated with, grid-like walls mutually connected by connection comprising, for each corner, a corner joint constituted by a main element, with a concave corner body in which positioning seats are provided for three converging grid-like walls, and at least one locking element for the three grid-like walls in the positioning seats. The locking element is formed monolithically with the main element and is further deformable in order to be arranged in the locking configuration.

18 Claims, 4 Drawing Sheets

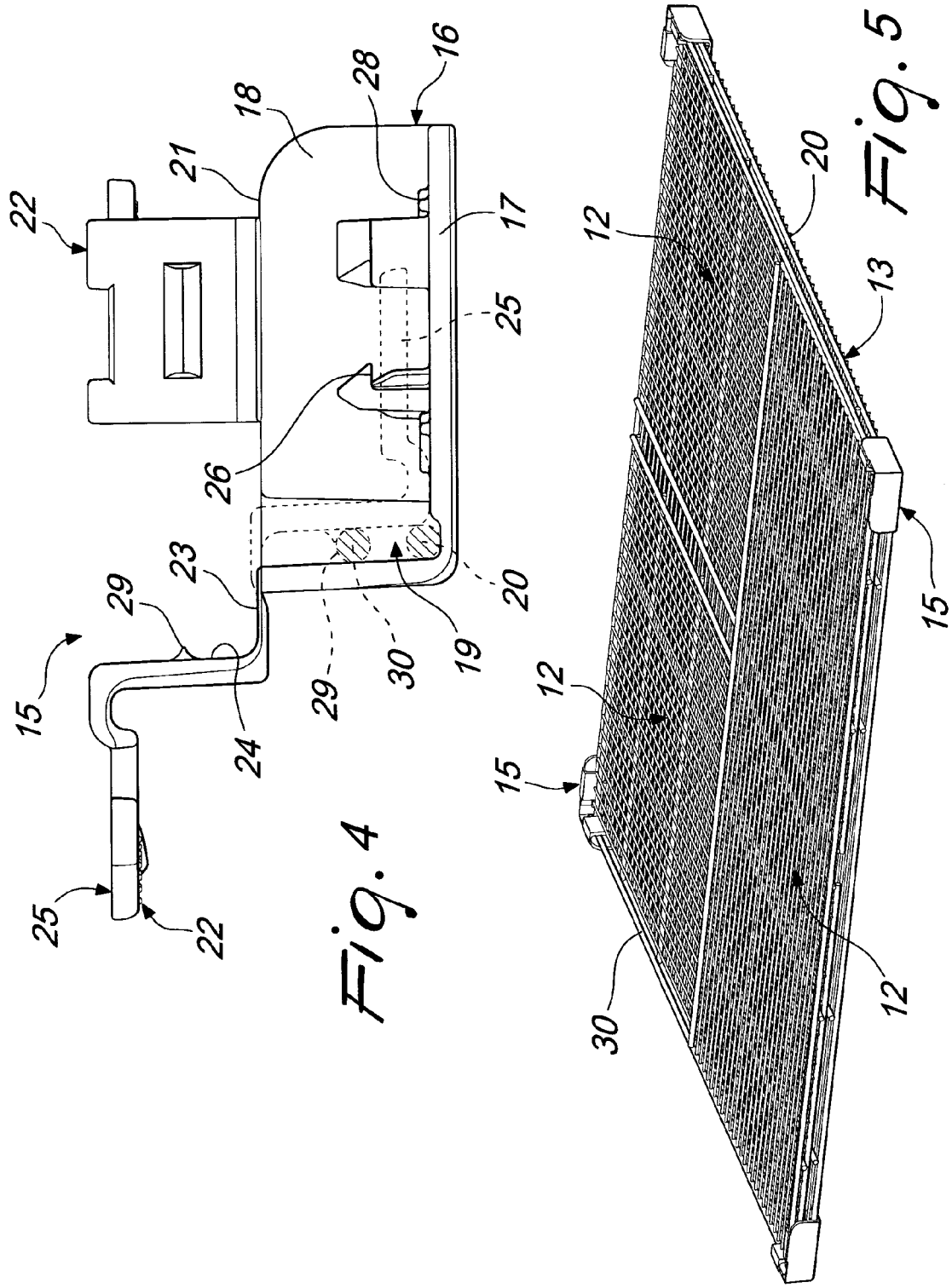

COLLAPSIBLE CAGE

The present invention relates to a collapsible cage.

BACKGROUND OF THE INVENTION

Collapsible cages, which can be used in the most disparate fields of application, such as the containment of animals, plants or the like, are constituted generally by a bottom that is surmounted by, and associated with, grid-like walls that are mutually connected by connecting means.

Said connecting means are generally of the reversible type and are constituted by coupling elements having various shapes and configurations, which ensure the connection between two converging walls.

As an alternative, there are connecting means constituted by axial couplings of elements of the grids in tubular connecting elements to be arranged at the corners.

However, these connecting means do not provide the characteristics of flexibility in application that are required by users, also in relation to the solidity and safety of the connection of the various elements.

In order to obviate these shortcomings in the field of collapsible cages, solutions have been proposed in U.S. Pat. No. 6,606,964B2 of the same Assignee.

Such patent discloses a collapsible cage provided with a bottom that is surmounted by, and associated with, grid-like walls that are mutually connected by applied connecting means.

The connecting means comprise a first corner joint, which is constituted by a first component provided with an angular concave body in which there are first seats for the positioning of three converging grid-like walls.

Said first component is associated, by way of reversible interlocking anchoring means, with a complementary second component, which is separate from the first component.

The purpose of said second component is to lock the three converging grid-like walls in their positioning seats.

Said second component is separate from the first component and is applied once the two converging side walls have been arranged vertically.

This solution adopted by the applicant, while being highly appreciated commercially, has aspects that can be improved and are linked in particular to reducing the manufacturing costs of the corner joint.

One problem that collapsible cages have always had is related to storage and handling of disassembled cages.

The packages that enclose the components of the cage, i.e., the bottom, the grid-like walls, the couplings, etc, are in fact particularly bulky and noisy.

The noise is caused by the vibrations that handling transmits from the box to the internal metallic components.

SUMMARY OF THE INVENTION

The aim of the present invention is to provide a collapsible cage that solves the drawbacks noted in known models of cage.

Within this aim, an object of the present invention is to provide a cage that can be assembled in various configurations simply and rapidly even by individuals and/or users who lack particular technical skills.

Another object of the present invention is to provide a cage that has low manufacturing costs with respect to known cages.

Another object of the present invention is to provide a cage that allows an excellent level of packing during storage.

Another object of the present invention is to provide a cage which, once disassembled and packed for packaging or transport, is particularly compact in order to avoid noisy vibrations during handling.

Another object of the present invention is to provide a cage whose structure can be manufactured with known systems and technologies.

This aim and these and other objects that will become better apparent hereinafter are achieved by a collapsible cage, which comprises a bottom that is surmounted by, and associated with, grid-like walls that are mutually connected by connecting means, which comprise at least one corner joint constituted by a main element, with a concave corner body in which there are positioning seats for three converging grid-like walls, and at least one locking element, for association with reversible interlocking anchoring means, for said three grid-like walls in said positioning seats, said cage being characterized in that said at least one locking element is formed monolithically with said main element, said at least one locking element being deformable in order to be arranged in the locking configuration.

BRIEF DESCRIPTION OF THE DRAWINGS

Further characteristics and advantages of the present invention will become better apparent from the following detailed description of an embodiment thereof, illustrated by way of non-limiting example in the accompanying drawings, wherein:

FIG. 4 is a side view of the corner joint of FIG. 3, shown before the cage assembly step, but illustrating in broken lines the method for locking two converging grid-like walls of the cage;

FIG. 5 is a perspective view of the collapsible cage of FIG. 1, with the grid-like walls collapsed for storing said cage;

DESCRIPTION OF THE PREFERRED EMBODIMENTS

Figure 1:
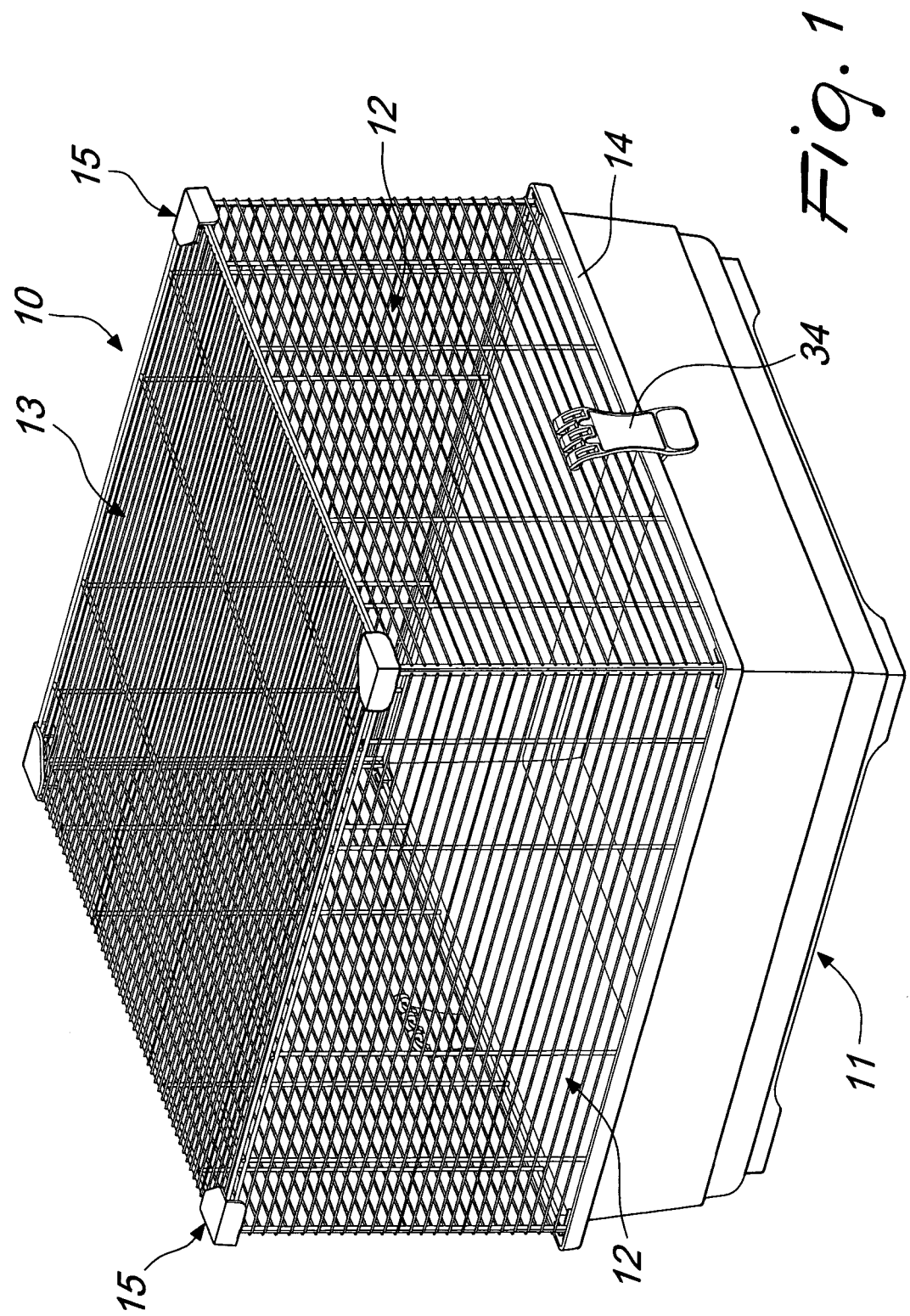
FIG. 1 is a perspective view of a collapsible cage according to the invention.

With reference to the figures, a collapsible cage according to the invention is generally designated by the reference numeral 10.

The collapsible cage 10 comprises a bottom 11, which is surmounted by, and associated with, grid-like walls, respectively four grid-like side walls 12 and a grid-like top wall 13.

The grid-like walls 12 and 13 are mutually connected by connecting means described hereinafter.

In the example being described, the bottom 11 is constituted by a box that is open at the top and on the upper rim 14 of which the four grid-like side walls 12 are rested and coupled substantially in a known manner (shown hereinafter for the sake of completeness).

The connecting means of the grid-like walls 12 and 13 comprise, in this embodiment, four corner joints 15, one for each upper corner of the cage 10.

Each corner joint 15 is constituted by a main element 16, which is provided with an angular concave body that is formed substantially by a base plate 17 with two sides that converge at 90° in a corner angle and on which two converging lateral shoulders 18 are provided.

Positioning seats 19 for three converging grid-like walls, substantially two side walls 12 and the top wall 13, are formed on the main element 16.

The positioning seats 19 are provided for example by way of converging longitudinal recesses, on which the contour or perimeter edge 20 (formed by four welded metallic rods) of the top wall 13 of the cage 10 rests.

An element 22 for locking the grid-like walls 12 and top wall 13 in the positioning seats 19 protrudes from each side of each corner joint 15 at the upper edges 21 of the lateral shoulders 18.

Each locking element 22 is formed monolithically with the main element 16, for example by injection-molding plastic material.

Each locking element 22 comprises a tab 23, which protrudes from the upper edge 21 of the corresponding lateral shoulder 18 and acts as a longitudinal flexible hinge for the locking element 22.

A complementary shoulder 24 protrudes from the tab 23 and, in cooperation with the corresponding lateral shoulder 18, locks in position the converging grid-like walls 12 and 13.

In particular, the tab 23 protrudes substantially at right angles with respect to the corresponding lateral shoulder 18, while the complementary shoulder 24 protrudes at right angles from the tab 23.

The locking element 22 is suitable to interact with reversible interlocking anchoring means, which couple, by way of its rotation about the tab 23, the free end to the base plate 17, thus stably locking the top wall 13 and the corresponding side wall 12.

Said reversible anchoring means are constituted for example by a locking wing 25, which is contoured so as to mate with a corresponding retention tooth 26 that protrudes from the base plate 17.

The locking wing 25 protrudes at right angles from the end of the complementary shoulder 24 that lies opposite the tab 23.

The locking element 22 can substantially flex from an open position, which corresponds substantially to the shape with which it is formed, and in which the locking element substantially protrudes from the upper edge 21 of the corresponding lateral shoulder 18 of the main element 16.

As mentioned, the locking element 22 can be deformed from said initial configuration to a locking configuration, in which the complementary shoulder 24 and the locking wing 25 rotate about the tab 23, which acts as a flexible hinge, and are arranged so that the locking wing 25 is coupled to the retention tooth 26 and the complementary shoulder 24 is substantially parallel and spaced, by an extent that is substantially equal to the tab, from the corresponding lateral shoulder 18.

In order to avoid unwanted movements of the locking wing 25 once it has been coupled to the corresponding retention tooth 26, a pivot-like tab 27 protrudes from the base plate 17 for the lateral abutment of both locking wings 25.

Further, compensation protrusions 28 protrude from the base plate 16 adjacent to the retention teeth 26 and are suitable to prevent the loose arrangement of the top wall 13 with respect to the corner joints 15, thus obtaining a less rigid structure.

Advantageously, a longitudinal rib 29 is provided on the face of the complementary shoulder 24 that faces the lateral shoulder 18 in the locking position and is substantially parallel to the converging sides of the corner joint 19.

The longitudinal rib 29 is designed to separate the space delimited by the complementary shoulder 24, by the lateral shoulder 18, by the tab 23 and by the longitudinal recess that forms the positioning seat 19, once the locking wing 25 is coupled to the retention tooth 26. This space, divided by the longitudinal rib 29, accommodates and locks respectively a portion of the contour 20 of the top wall 13 and the lateral edge 30 (both formed by four welded metallic rods) of the corresponding side wall 12.

Figure 2:
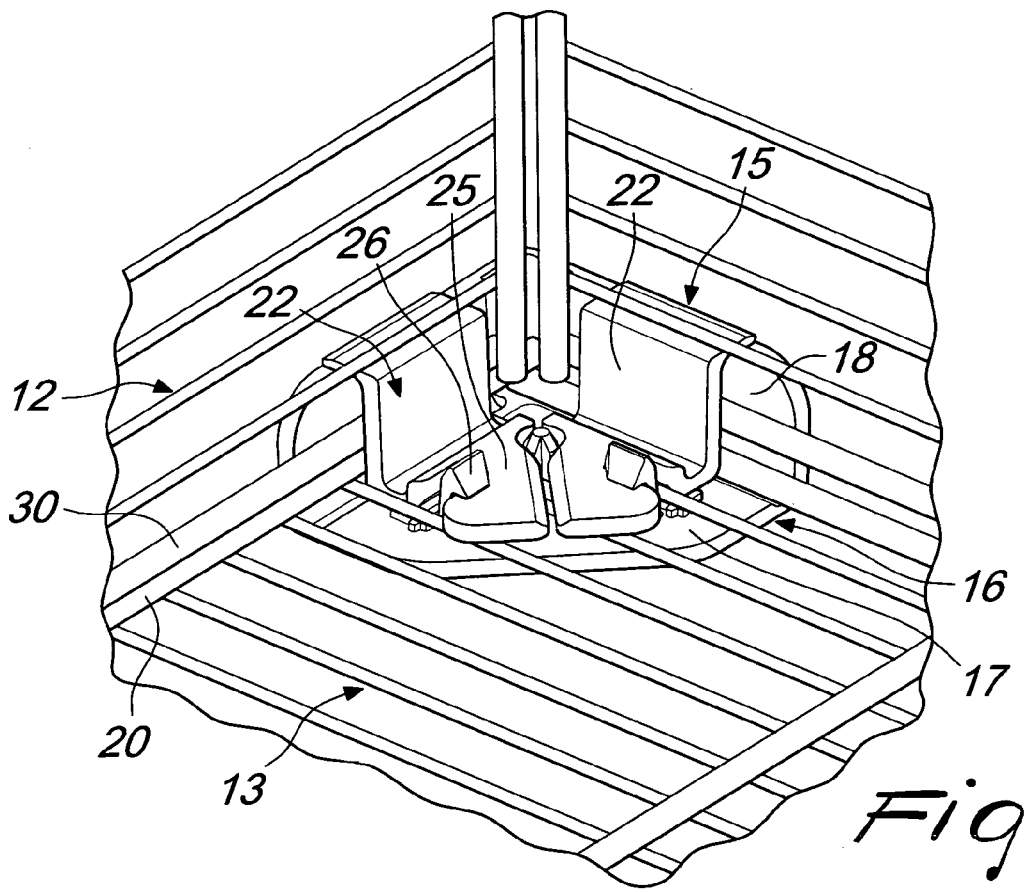
FIG. 2 is a perspective view of a detail of the collapsible cage of FIG. 1, related to a corner joint, shown during the assembly of the cage.
Figure 3:
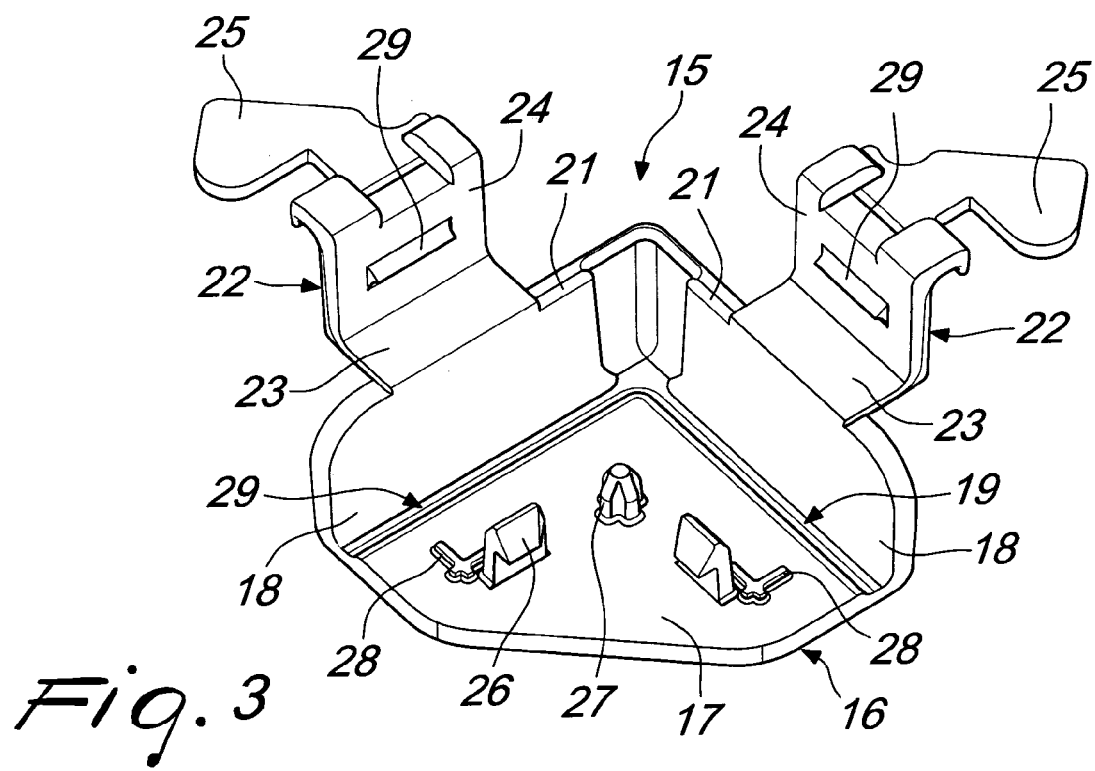
FIG. 3 is a perspective view of a corner joint of the collapsible cage of the preceding figures, shown before the step for assembling the cage.
Figure 6:
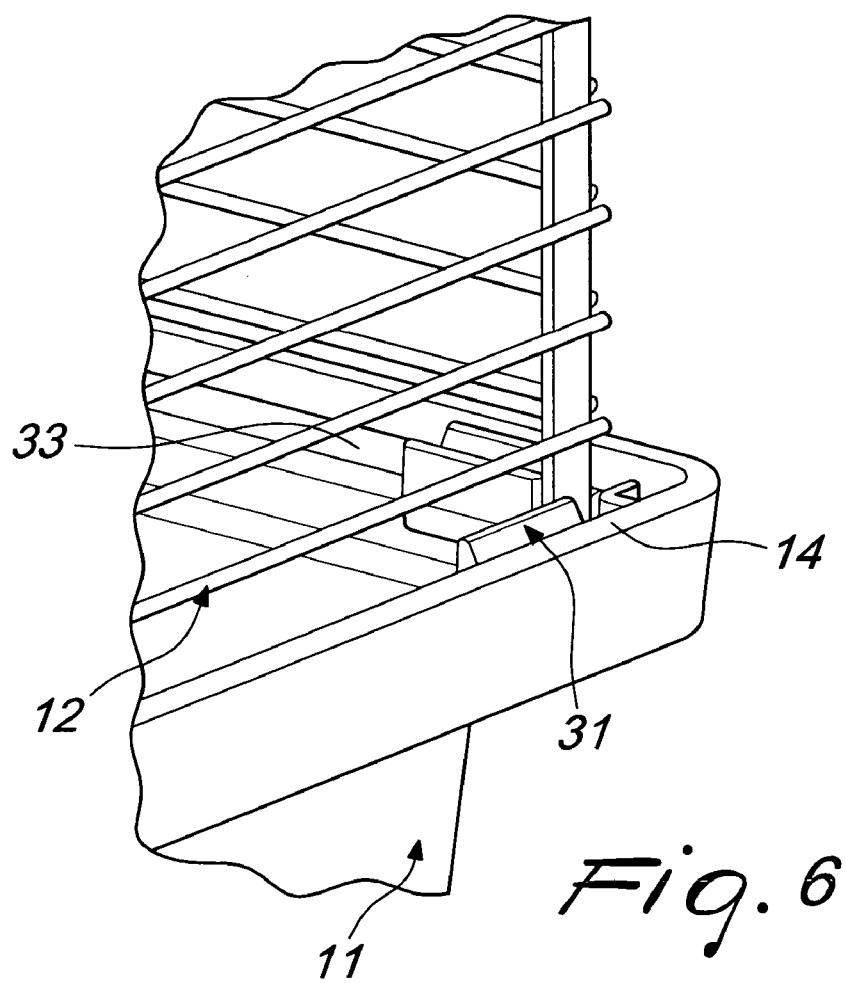
FIG. 6 is a perspective view of a lower portion of the collapsible cage of FIG. 1.
Figure 7:
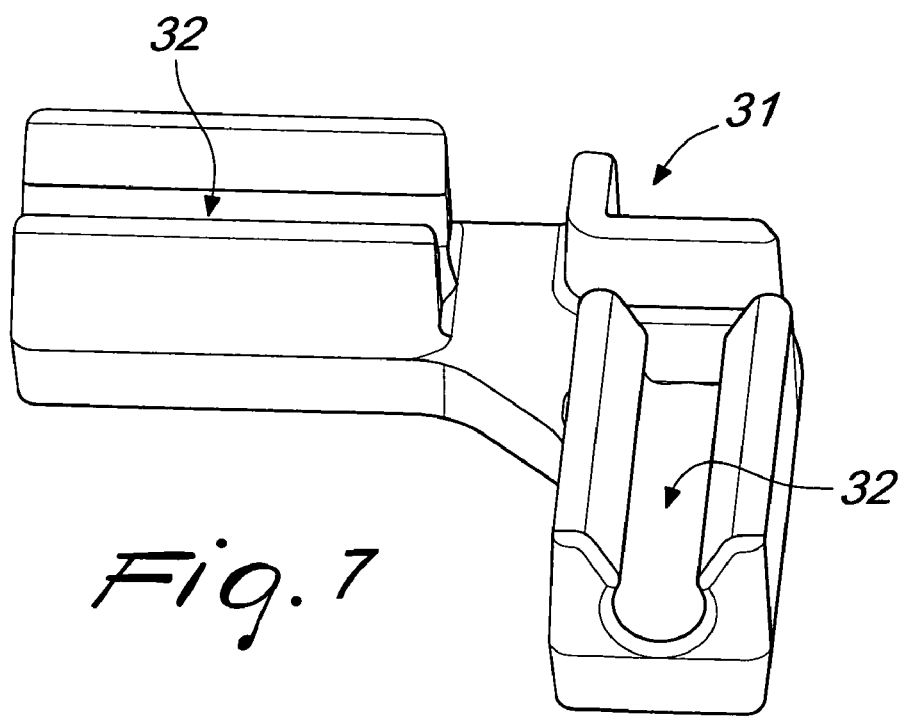
FIG. 7 is a perspective view of a component for fixing the side walls of the cage to the bottom of said cage.

When the cage 10 is assembled, the contour 20 of the top wall 13 and the lateral edges 30 of the side wall 12 are comprised between the rib 29 and the longitudinal recess that forms the positioning seat 19 (as shown in FIGS. 2 and 4).

When instead the cage 10 is disassembled, as shown in FIG. 5, the side walls 12 are collapsed onto the top wall 13 so as to assume a substantially flat configuration.

In said flat configuration, the contour 20 of the top wall 13 is comprised between the longitudinal recess that forms the positioning seat 19 and the longitudinal rib 29, while the lateral edge 30 of the side wall 12 is comprised between the longitudinal rib 29 and the tab 23.

The side walls 12 are in practice hinged along their lateral edges 30, by way of the coupling imposed by the locking element 22 in the locking configuration on the main element 16, to the top wall 13.

The side walls 12 are fixed to the rim 14 of the box that forms the bottom 11 of the cage 10 by means of a corner support 31, which comprises two portions that converge at right angles and on which there are seats with an interlocking that is reversible by elastic deformation 32, on which the corresponding lateral edges of the side walls 12 are arranged and locked stably.

The corner support 31 rests on an internal ledge 33 formed by the rim 14.

In order to lock the side walls 12 arranged on the corner supports 31 to the bottom 11 of the cage, there are reversible coupling means of a known type, such as for example hooks 34 which are pivoted to the walls 12 and grip the rim 14.

The assembly of the cage 10 is as follows.

A corner joint 15 is arranged on each corner of the top wall 13, so that the contour 20 of the wall 13 is arranged at the longitudinal recesses that form the positioning seat 19.

In this step, the locking elements 22 are not deformed and protrude substantially from the upper edges 21 of the lateral shoulders 18 of each corner joint 15.

At this point, the side walls 12 are arranged one by one at the lateral shoulders 18 so that their lateral edges 30 are arranged adjacent to the contour 20 of the top wall 13.

The locking elements 22 related to the sides of the corner joints 15 that are parallel to the side wall 12 being considered are deformed.

The deformation of each locking element 22 in practice is a flexing, which is suitable to bring the locking element 22 into the locking configuration, in which the complementary shoulder 24 is parallel to the corresponding lateral shoulder 18 and is such as to lock in a substantially sandwich-like arrangement the lateral edge 30 of the side wall 12 being considered.

In this locking configuration, the locking element wing 25 is coupled to the corresponding retention tooth 26.

In particular, the side wall 12 is assembled in the following manner: the locking element 22 is fitted on the last grid-like portion of the side wall 12 that is adjacent to the lateral edge 30 of the wall 12.

In this step, the side wall 12 is substantially orientated in the opposite direction with respect to the direction that it will assume once it is fitted on the corner joint 15.

By turning the side wall 12 through 180°, the corresponding lateral edge 30 is arranged adjacent to the contour 20 of the top wall 13 and at the same time the locking element 22 is flexed by being turned about its flexible hinge (the tab 23), in practice arranging itself inside the corner joint 15.

In this manner, the locking wing 25 can be mated easily with the corresponding retention tooth 26.

The contours 20 of the top wall 13 and of the side wall 12 are sandwiched between the lateral shoulder 18 of the main element 16 and the complementary shoulder 24 of the locking element 22.

This operation must be performed substantially for all four side walls 12.

During this assembly step, the lateral edge 30 of the side walls 12 inserted in the corner joint 15 is comprised between the longitudinal rib 29 and the tab 23 of the locking element 22.

Advantageously, the side walls 12 can be collapsed onto the top wall 13 so as to assume substantially a flat configuration, which is useful for storage and transport.

When it is necessary to assemble the cage 10 from said flat configuration, it is sufficient to lift through 90° the side walls 12 from the top wall 13.

Once the side walls 12 have been lifted, pushing each side wall 12 toward the top wall 13, the corresponding lateral edge 30 of the side wall 12 forces the longitudinal rib 30 formed on the complementary shoulder 24, and is thus stably coupled, in practice by means of a snap-acting coupling, so as to be contiguous with the contour 20 of the top wall 13.

With the four side walls 12 stably fixed at right angles to the top wall 13 on the corner joints 15, the assembly of the walls can be rested on the upper rim 14 of the box that forms the bottom 11 and be locked in a substantially known manner.

In practice it has been found that the invention thus described solves the problems noted in known types of collapsible cage.

In particular, the present invention provides a collapsible cage in which the corner joints for composing the walls are extremely simplified with respect to known types of corner joint.

The corner joints according to the invention are in fact provided as a single component that is extremely simple from a structural standpoint.

Further, the present invention provides a collapsible cage that allows an extremely simplified assembly of said cage.

By way of the particular corner joints, it is in fact possible to fix the walls of the cage rapidly and simply.

Further, the present invention provides a collapsible cage that allows to store the elements of the cage rapidly and compactly.

The side walls of the cage can in fact be collapsed onto the top wall and at the same time are pivoted to said top wall by way of the corner joints.

The particular compact structure during storage, i.e., with the side walls collapsed onto the top wall, allows to reduce the metallic noise caused by vibrations produced by any movement of the packaging of the cage during storage.

The term "substantially" as used herein is intended to indicate that the features to which it refers have the characteristics mentioned but for tolerances known to those skilled in the pertinent art.

In practice, the materials employed, so long as they are compatible with the specific use, as well as the dimensions, may be any according to requirements and to the state of the art.

The disclosures in Italian Patent Application No. PD2004U000058 from which this application claims priority are incorporated herein by reference.

What is claimed is:

1. A collapsible cage, including a bottom, grid shaped walls that surmount said bottom and are associated therewith and to connecting means for connecting to each other said walls, said connecting means comprising: at least one corner joint constituted by a main element with a concave corner body, said main element comprising a base plate with two sides that converge at 90° in a corner angle, two converging lateral shoulders located on said sides, and converging longitudinal recesses formed along said shoulders so as to form positioning seats for three converging ones of said grid-shaped walls and in which a border edge of a top one of said grid shaped walls rests; at least one locking element comprising a tab which protrudes substantially at right angles from an upper edge of a corresponding one of said lateral shoulders and is adapted to act as a longitudinal flexible hinge of the at least one locking element, and a complementary shoulder that protrudes substantially at right angles from said tab to lock in position in cooperation with said corresponding lateral shoulder said grid shaped walls; and reversible interlocking anchoring means connected with said at least one locking element for anchoring said three grid-shaped walls in said positioning seats, said at least one locking element being formed monolithically with said main element and said at least one locking element being deformable in order to be arrangeable in a locking configuration.

2. The cage of claim 1, comprising a plurality of locking elements, said reversible anchoring means comprising, for each one of said locking elements, a locking wing and a retention tooth which protrudes from said base plate, said locking wing having a contoured shape, for coupling to a corresponding said retention tooth, said locking wing protruding at right angles from an end of a corresponding said complementary shoulder that lies opposite said tab, said reversible interlocking anchoring means rigidly coupling a free end of said locking element to said base plate.

3. The cage of claim 2, comprising a pivot-shaped tab that protrudes from said base plate for providing lateral abutment for two of said locking wings upon coupling thereof to a corresponding said retention tooth.

4. The cage of claim 3, comprising compensation protrusions that protrude from said base plate, adjacent to said retention tooth, said compensation protrusions being suitable to prevent looseness of said top wall upon arrangement thereof with respect to said corner joints.

5. The cage of claim 2, comprising a longitudinal rib provided on a face of said complementary shoulder that faces a said lateral shoulder in a locking position, said rib being substantially parallel to the converging sides of said corresponding corner joint, said longitudinal rib, with said locking wing coupled to said retention tooth, separating a space delimited by a said complementary shoulder, by a said lateral shoulder, by a said tab and by a said longitudinal recess that forms a said positioning seat.

6. The cage of claim 2, wherein said bottom is constituted by a box that is open upward and has an upper rim, four of said grid shaped walls, forming side walls, being rested and coupled to said upper rim.

7. The cage of claim 2, wherein said locking element is provided so as to be deformable by flexing from an open position, which corresponds substantially to a manufacturing shape thereof, and in which said locking element protrudes substantially from the upper edge of the corresponding said lateral shoulder of said main element.

8. The cage of claim 6, adapted to assume two configurations, a first assembled cage configuration, in which said grid shaped side walls are arranged vertically, and a second disassembled cage configuration, in which said grid shaped side walls are folded onto said top grid shaped wall so as to assume a substantially flat configuration, said side grid shaped walls being pivoted at lateral edges thereof, by way of a coupling forced by said locking clement in locking configuration on said main element, to said grid shaped top wall.

9. A collapsible cage, including a bottom, grid shaped walls that surmount said bottom and are associated therewith and to connecting means for connecting to each other said walls, said connecting means comprising: at least one corner joint constituted by a main element with a concave corner body, said main element comprising a base plate with two sides that converge at 90° in a corner angle, two converging lateral shoulders located on said sides, and converging longitudinal recesses formed along said shoulders so as to form positioning seats for three converging ones of said grid-shaped walls and in which a border edge of a top one of said grid shaped walls rests; a plurality of locking elements formed monolithically with said main element and which are deformable in order to be arrangeable in a locking configuration, each one of said locking elements comprising a tab that protrudes from an upper edge of a corresponding shoulder of said lateral shoulders and a complementary shoulder protruding from said tab to look in position in cooperation with said corresponding lateral shoulder said grid shaped walls; and reversible interlocking anchoring means for anchoring said three grid-shaped walls in said positioning seats, said reversible interlocking anchoring means rigidly coupling a free end of said locking elements to said base plate and comprising for each one of said locking elements a retention tooth which protrudes from said base plate and a locking wing that protrudes at right angles from an end of a corresponding said complementary shoulder that lies opposite said tab, said locking wing having a contoured shape for coupling to a corresponding said retention tooth.

10. The cage of claim 9, comprising a pivot-shaped tab that protrudes from said base plate for providing lateral abutment for two of said locking wings upon coupling thereof to a corresponding said retention tooth.

11. The cage of claim 10, comprising compensation protrusions that protrude from said base plate, adjacent to said retention tooth, said compensation protrusions being suitable to prevent looseness of said top wall upon arrangement thereof with respect to said corner joints.

12. The cage of claim 9, comprising a longitudinal rib provided on a face of said complementary shoulder that faces a said lateral shoulder in a locking position, said rib being substantially parallel to the converging sides of said corresponding corner joint, said longitudinal rib, with said locking wing coupled to said retention tooth, separating a space delimited by a said complementary shoulder, by a said lateral shoulder, by a said tab and by a said longitudinal recess that forms a said positioning seat.

13. The cage of claim 9, wherein said bottom is constituted by a box that is open upward and has an upper rim, four of said grid shaped walls, forming side walls, being rested and coupled to said upper rim.

14. The cage of claim 9, wherein said locking elements are provided so as to be deformable by flexing from an open position, which corresponds substantially to a manufacturing shape thereof, and in which said locking elements protrude substantially from the upper edge of the corresponding said lateral shoulder of said main element.

15. The cage of claim 13, adapted to assume two configurations, a first assembled cage configuration, in which said grid shaped side walls are arranged vertically, and a second disassembled cage configuration, in which said grid shaped side walls arc folded onto said top grid shaped wall so as to assume a substantially flat configuration, said side grid shaped walls being pivoted at lateral edges thereof, by way of a coupling forced by said locking elements in locking configuration on said main element, to said grid shaped top wall.

16. A collapsible cage, including a bottom, grid shaped walls that surmount said bottom and are associated therewith and to connecting means for connecting to each other said walls, said connecting means comprising:
at least one corner joint constituted by a main element with a concave corner body, said main element comprising a base plate with two sides that converge at 90° in a corner angle, two converging lateral shoulders located on said sides, and converging longitudinal recesses formed along said shoulders so as to form positioning seats for three converging ones of said grid-shaped walls and in which a border edge of a top one of said grid shaped walls rests; a plurality of locking elements formed monolithically with said main element and which are deformable in order to be arrangeable in a locking configuration, each one of said locking elements comprising a tab that protrudes from an upper edge of a corresponding shoulder of said lateral shoulders and a complementary shoulder protruding from said tab to lock in position in cooperation with said corresponding lateral shoulder said grid shaped walls; and reversible interlocking anchoring means for anchoring said three grid-shaped walls in said positioning seats, said reversible interlocking anchoring means rigidly coupling a free end of said locking elements to said base plate and comprising for each one of said locking elements a retention tooth which protrudes from said base plate and a locking wing that protrudes at right angles from an end of a corresponding said complementary shoulder that lies opposite said tab, said locking wing having a contoured shape for coupling to a corresponding said retention tooth; and wherein
the cage is adapted to assume two configurations, a first assembled cage configuration, in which said grid shaped side walls are arranged vertically, and a second disassembled cage configuration, in which said grid shaped side walls are folded onto said top grid shaped wall so as to assume a substantially flat configuration, said side grid shaped walls being pivoted at lateral edges thereof, by way of a coupling forced by said locking elements in locking configuration on said main element, to said grid shaped top wall.

17. The cage of claim 16, comprising compensation protrusions that protrude from said base plate, adjacent to said retention tooth, said compensation protrusions being suitable to prevent looseness of said top wall upon arrangement thereof with respect to said corner joints.

18. The cage of claim 16, wherein said bottom is constituted by a box that is open upward and has an upper rim, four of said grid shaped walls, forming side walls, being rested and coupled to said upper rim.

* * * * *